United States Patent [19]

Babini

[11] 4,280,086
[45] Jul. 21, 1981

[54] METHOD OF AND CIRCUIT ARRANGEMENT FOR DISCHARGING A STORAGE CAPACITOR

[75] Inventor: Giancarlo Babini, Turin, Italy

[73] Assignee: CSELT Centro Studi e Laboratori Telecomunicazioni S.p.A., Turin, Italy

[21] Appl. No.: 107,661

[22] Filed: Dec. 27, 1979

[30] Foreign Application Priority Data

Dec. 28, 1978 [IT] Italy ............... 69975 A/78

[51] Int. Cl.³ .................. H02J 3/00; H02J 15/00
[52] U.S. Cl. .................................. 320/1; 370/113
[58] Field of Search .............. 365/45; 320/1; 370/6, 370/113

[56] References Cited

U.S. PATENT DOCUMENTS 3,412,208  11/1968  Jacob ........................ 320/1 X

FOREIGN PATENT DOCUMENTS 590832  2/1978  U.S.S.R. ........................ 365/45

*Primary Examiner*—Stuart N. Hecker
*Attorney, Agent, or Firm*—Karl F. Ross

[57] ABSTRACT

A storage capacitor of a sample-and-hold circuit, e.g. as used in a converter for the digitization of signal amplitudes in a PCM telephone system, is provided with a zero-setting gate comprising two parallel branches that include a first and a second transistor which are respectively saturated during a cancellation phase and a discharge phase of a resetting interval following a sampling period. The first transistor lies in series with a d-c source whose voltage substantially exceeds the maximum amplitude of signals of the same polarity to be stored on that capacitor whereby the latter acquires a charge within a range considerably narrower than the spread of positive and negative signal amplitudes. The second transistor then short-circuits the capacitor so charged, leaving a residual charge of predetermined polarity subject to still smaller variations in magnitude.

6 Claims, 4 Drawing Figures

METHOD OF AND CIRCUIT ARRANGEMENT FOR DISCHARGING A STORAGE CAPACITOR

FIELD OF THE INVENTION

My present invention relates to a method of and a circuit arrangement for periodically dissipating the charge of a storage capacitor of a sample-and-hold circuit in which that capacitor is intermittently charged with analog message samples, e.g. for the purpose of digitization.

BACKGROUND OF THE INVENTION

Sample-and-hold circuits using such storage capacitors are employed, for example, in analog/digital converters of a pulse-code-modulation (PCM) telephone system in which subscriber lines are sampled during respective time slots and the resulting voice samples are transmitted to the capacitor for temporary storage. Toward the end of each time slot, the capacitor must be discharged before receiving the next voice sample.

Conventional discharge circuits comprise an electronic gate, such as a transistor generally in series with a protective diode, which in its conductive state substantially short-circuits the capacitor. Even when fully saturated, such a transistor has an internal resistance which increases significantly when their emitter/collector voltage drops below a certain threshold. The protective diode usually associated with the transistor also has such a nonlinear forward resistance. As a result, the capacitor retains a not insignificant residual charge at the end of the limited resetting interval during which the gate conducts, thereby giving rise to undesirable cross-talk between subscribers in adjoining time slots.

The dissipation of a capacitor charge can, of course, be accelerated by using several parallel-connected transistors in the associated discharge gate. This, however, increases the cost of manufacture and maintenance while also giving rise to problems of synchronization to insure the simultaneous saturation of all transistors.

OBJECTS OF THE INVENTION

An important object of my present invention, therefore, is to provide a method of more effectively dissipating the charge of a storage capacitor within a resetting interval of predetermined duration.

A related object is to provide simple circuitry for carrying out this method.

SUMMARY OF THE INVENTION

In accordance with my present invention, a capacitor storing a message sample within a predetermined range of positive and negative signal amplitudes is overcharged during a first or cancellation phase of each resetting interval from a source of unipolar biasing voltage (negative in the embodiment described hereinafter) whose absolute magnitude substantially exceeds the maximum signal amplitude of the same polarity (negative) and at a rate high enough to let the capacitor voltage reach a level close to the biasing voltage. In a second or discharge phase of the resetting interval, the capacitor is substantially short-circuited to reduce its voltage to a level close to zero.

Although the time available for this discharge step is only a fraction of the resetting interval and is therefore substantially shorter than with the procedure first described, the residual charge of the capacitor—aside from being always of one and the same polarity—will vary within a much narrower range than in the conventional case.

A circuit arrangement for carrying out my improved method comprises a first electronic switch connected across the capacitor in series with the aforementioned source of biasing voltage and a second electronic switch connected across the capacitor in parallel with the series combination of the first switch and the biasing source. The two phases of the resetting interval are established by timing means closing the first switch during the first phase and the second switch during the second phase, preferably in immediate succession. As discussed above, the semiconductors constituting these electronic switches will have threshold voltages below which their resistance increases significantly. For reasons which will become apparent hereinafter, the absolute magnitude of the biasing voltage should be chosen to exceed the maximum signal amplitude of the same polarity (e.g. negative) by at least that threshold voltage but should be only so high that the capacitor voltage reaches a value which falls short of the biasing voltage by not more than the threshold voltage at the end of the first phase, with the residual value of the capacitor voltage at the end of the second phase being not higher than this threshold voltage.

BRIEF DESCRIPTION OF THE DRAWING

The above and other features of my invention will now be described in detail with reference to the accompanying drawing in which.

SPECIFIC DESCRIPTION

Figure 1:
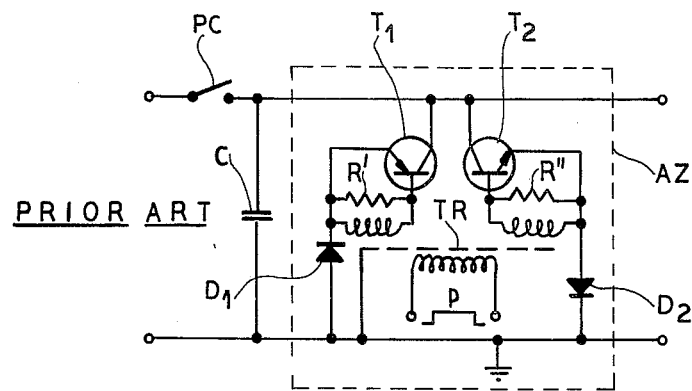
FIG. 1 is a circuit diagram showing a storage capacitor with a conventional discharge gate.

FIG. 1 illustrates a conventional storage capacitor C of a sample-and-hold circuit as used in a PCM telephone system, this capacitor being periodically chargeable with incoming voice samples by a gate schematically shown as a switch PC and being periodically discharged by a circuit AZ comprising two transistors $T_1$ (PNP) and $T_2$ (NPN) connected across the capacitor in series with protective diodes $D_1$ and $D_2$, respectively. Connected across the emitters and bases of these transistors are biasing resistors R' and R" in parallel with respective secondary windings of a control transformer TR whose primary winding receives a discharge pulse p during a recurrent resetting interval. The normally nonconductive transistors $T_1$ and $T_2$ are saturated by this pulse p to dissipate the existing charge on capacitor C, causing a discharge current to pass through one or the other transistor depending on the polarity of the charge.

Figure 2:
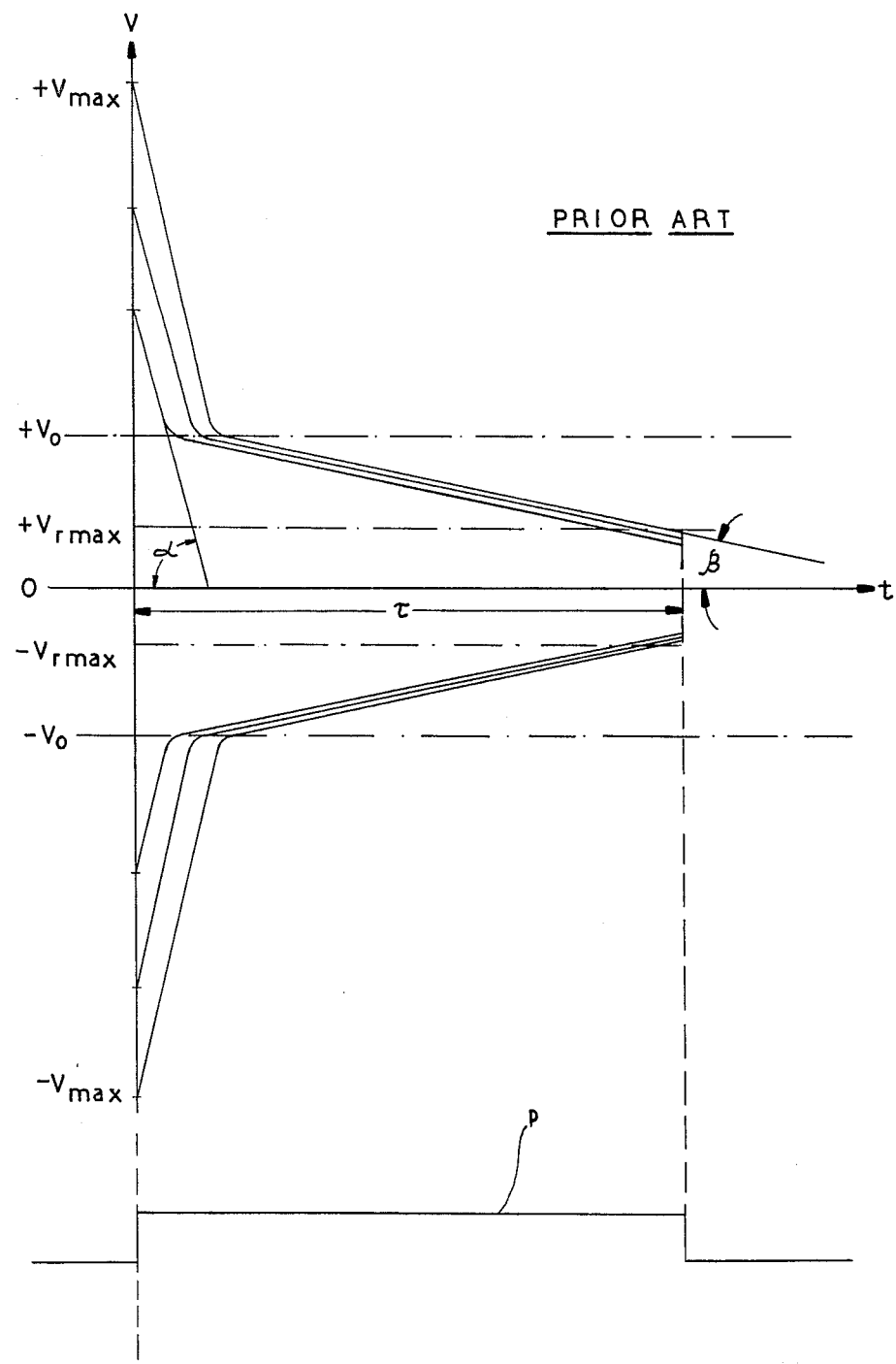
FIG. 2 is a graph relating to the operation of the discharge gate shown in FIG. 1.

As indicated in FIG. 2, the discharge pulse p has a duration $\tau$ defining a resetting interval at the end of a time slot during which the capacitor receives an analog voice sample for digitization by a nonillustrated conversion stage downstream of the sample-and-hold circuit shown in FIG. 1. The capacitor has a voltage V which ranges between a maximum and a minimum signal amplitude $+V_{max}$ and $-V_{max}$. Also indicated in the graph of FIG. 2 are a positive threshold voltage $+V_o$, below which the resistance of the discharge path $T_2$, $D_2$ increases significantly, as well as a corresponding negative threshold voltage $-V_o$ below which a significant increase occurs in the resistance of the discharge path $T_1$, $D_1$. The idealized curves of FIG. 2 show the descent of the capacitor voltage from a higher absolute value to threshold voltage $+V_o$ or $-V_o$ at a relatively large angle $\alpha$ and the subsequent decrease toward zero at a relatively small angle $\beta$. At the end of the resetting interval $\tau$, the capacitor still has a residual voltage ranging between a positive and a negative limit $+V_{rmax}$ and $-V_{rmax}$, these limits applying when the original signal amplitudes have the values $+V_{max}$ or $-V_{max}$, respectively. Thus, the residual voltage may vary between these two limits over a range equal to 2 $V_{rmax}$.

Figure 3:
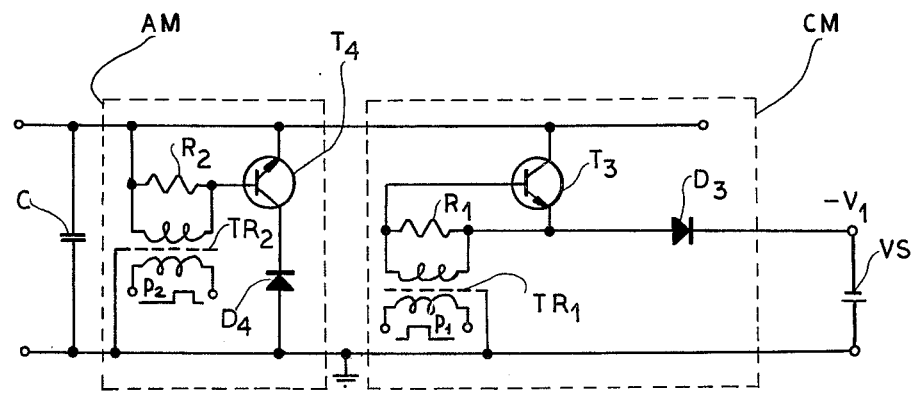
FIG. 3 is a circuit diagram generally similar to FIG. 1 but showing an improved zero-setting gate according to my invention.

In FIG. 3 I have shown the circuit AZ of FIG. 1 replaced by two circuit branches CM and AM connected in parallel across capacitor C. Branch CM comprises an NPN transistor $T_3$ with a collector connected to the ungrounded terminal of capacitor C and an emitter connected to its grounded terminal via a protective diode $D_3$ and a voltage source VS applying a negative bias $-V_1$ to the electronic switch constituted by the series combination of transistor $T_3$ and diode $D_3$. The base and emitter of this transistor are interconnected by a biasing resistor $R_1$ in parallel with the secondary of a control transformer $TR_1$ whose primary receives, during a cancellation phase of a resetting interval, a saturating pulse $P_1$. Circuit branch AM comprises an NPN transistor $T_4$ with an emitter connected to the ungrounded terminal of capacitor C and a collector connected to its grounded terminal by way of a protective diode $D_4$. Transistor $T_4$, too, has its base and emitter bridged by a biasing resistor $R_2$ in parallel with the secondary of a control transformer $TR_2$ whose primary receives, during a discharge phase, a saturating pulse $P_2$. Circuit branch AM is, in fact, similar to one half of the discharge circuit AZ shown in FIG. 1.

Figure 4:
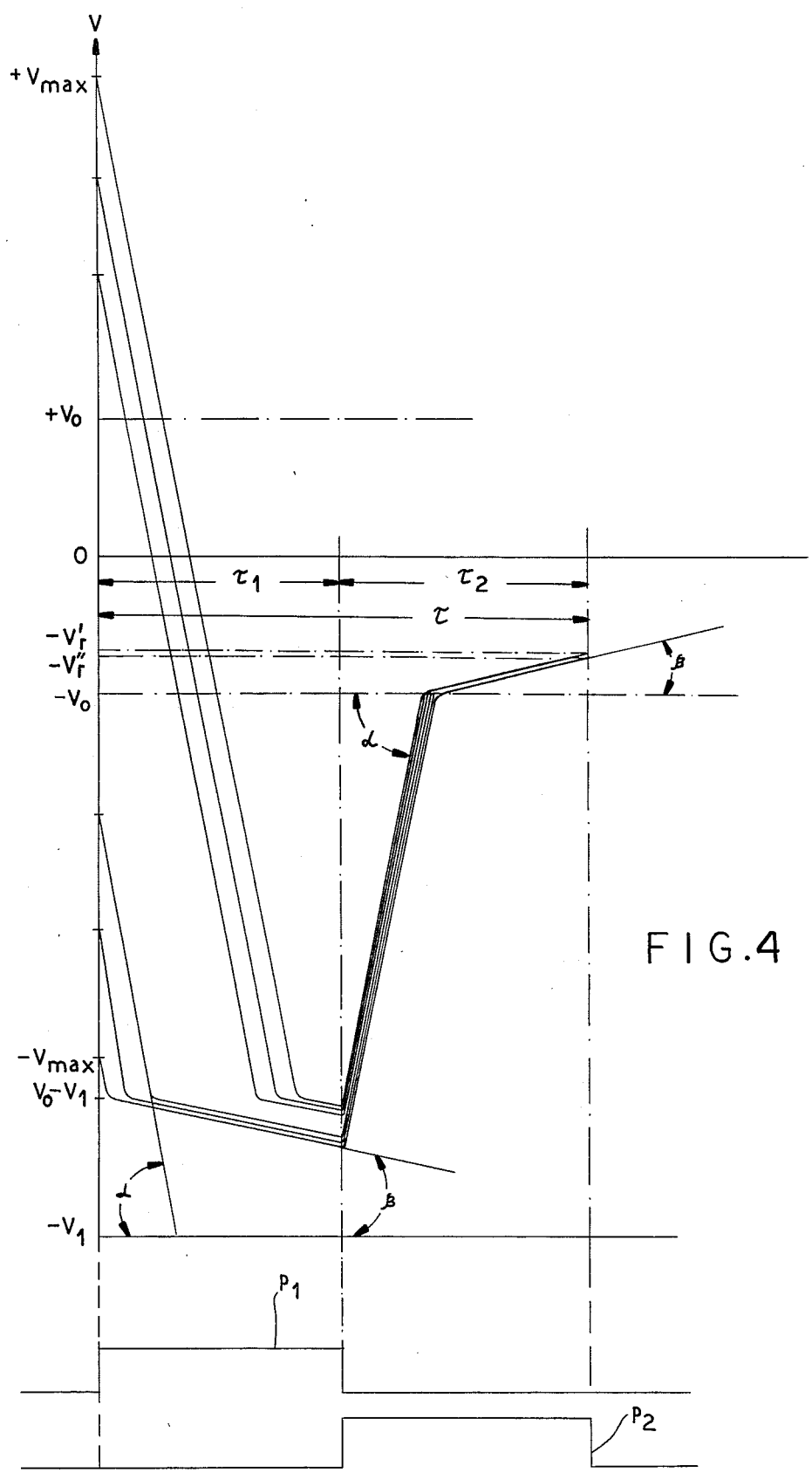
FIG. 4 is a graph similar to FIG. 2 but relating to the operation of the gate circuit shown in FIG. 3.

Biasing voltage $-V_1$ has an absolute magnitude which, as seen in FIG. 4, is substantially greater than that of the maximum negative signal amplitude $-V_{max}$; the difference between voltages $-V_{max}$ and $-V_1$ is, in fact, greater than the threshold voltage $V_o$. Pulses $P_1$ and $P_2$ occur during respective phases $\tau_1$ and $\tau_2$ of the resetting interval $\tau$ which has the same duration as in FIG. 2; voltage levels $\pm V_{max}$ and $\pm V_o$ as well as angles $\alpha$ and $\beta$ are also the same as in FIG. 2, to facilitate comparison.

At the beginning of the resetting interval $\tau$, pulse $P_1$ applies the biasing voltage $-V_1$ across the capacitor C of FIG. 3 which is therefore rapidly charged negative, regardless of the magnitude and sign of its existing charge, to a negative level of $V_o - V_1$ at which point the voltage difference across transistor $T_3$ and diode $D_3$ corresponds to the threshold $V_o$. Thus, the slope of the idealized discharge curves changes to the smaller angle $\beta$ as the capacitor voltage approaches the biasing level $-V_1$. At the end of phase $\tau_1$, the disappearance of pulse $P_1$ and the appearance of pulse $P_2$ turns off the transistor $T_3$ and saturates the transistor $T_4$ whereby the capacitor voltage V rapidly approaches the threshold $-V_o$ (angle $\alpha$). Upon reaching that threshold, before the end of the discharge phase $\tau_2$, the voltage changes more gradually (angle $\beta$) as it approaches zero until the resetting interval $\tau$ is terminated with the disappearance of pulse $P_2$. It will be noted that the residual voltage at that instant lies in a very narrow dynamic range with limiting values $-V_r'$ and $-V_r''$ of the same polarity (negative) whose difference is substantially less than the voltage swing of $+2 V_{rmax}$ described with reference to FIGS. 1 and 2. In fact, a sharp narrowing of the dynamic range from the spread between $+V_{max}$ and $-V_{max}$ already occurs at the end of phase $\tau_1$ as will likewise be apparent from FIG. 4.

The minor fluctuations of the residual capacitor voltage at the end of each resetting interval do not produce any appreciable cross-talk and their mean value merely acts as an additional d-c offset. The circuitry of FIG. 3 is barely more complex than that of FIG. 1, using a source of negative biasing voltage $-V_1$ normally available in a telecommunication system. If a positive biasing source is at hand, the polarities of transistors $T_3$, $T_4$ and the orientation of diodes $D_3$, $D_4$ may be inverted to apply a positive overcharge to capacitor C during the cancellation phase $\tau_1$; the operation will then be essentially the same, except that the residual capacitor voltage will always be of positive polarity.

The improvement represented by the circuitry of FIG. 3 will be particularly marked where there is a high slope ratio $\alpha/\beta$ corresponding to a large difference in semiconductor resistance above and below the threshold voltage $V_o$.

I claim:

1. A method of periodically dissipating the charge of a storage capacitor charged in the interim with message samples within a predetermined range of positive and negative signal amplitudes, comprising the steps of:
    overcharging said capacitor, during a first phase of a resetting interval, from a source of unipolar biasing voltage of an absolute magnitude substantially exceeding the maximum signal amplitude of the same polarity and at a rate high enough to let the capacitor voltage reach a level close to said biasing voltage; and
    substantially short-circuiting said capacitor during a second phase of said resetting interval for reducing the capacitor voltage to a level close to zero.

2. A method as defined in claim 1 wherein the charging and the substantial short-circuiting of said capacitor in said first and second phases is carried out with the aid of electronic switches having a threshold voltage below which their resistance increases significantly, the absolute magnitude of said biasing voltage being chosen to exceed said maximum signal amplitude by at least said threshold voltage but only so high that the capacitor voltage reaches a value differing from said biasing voltage by not more than said threshold voltage at the end of said first phase and drops down to a residual value not higher than said threshold voltage at the end of said second phase.

3. A method as defined in claim 2 wherein said electronic switches are NPN transistors, said biasing voltage being negative.

4. A circuit arrangement for periodically dissipating the charge of a storage capacitor provided with intermittently conducting gate means for charging said capacitor with message samples within a predetermined range of positive and negative signal amplitudes between resetting intervals, comprising:
    a first electronic switch connected across said capacitor in series with a source of unipolar biasing voltage of an absolute magnitude substantially exceeding the maximum signal amplitude of the same polarity;

a second electronic switch connected across said capacitor in parallel with the series combination of said first switch and said source; and timing means for closing said first switch during a first phase of each resetting interval, thereby charging said capacitor to a level close to said biasing voltage, and closing said second switch during a second phase of each resetting interval following said first phase, thereby discharging said capacitor to a level close to zero.

5. A circuit arrangement as defined in claim 4 wherein said first and second switches are series combinations of transistors and diodes having a threshold voltage below which their resistance increases significantly in a state of saturation of said transistors, the absolute magnitude of said biasing voltage exceeding said maximum signal amplitude by at least said threshold voltage.

6. A circuit arrangement as defined in claim 5 wherein said transistors are of NPN type, said biasing voltage being negative.

* * * * *